United States Patent
Timsjo et al.

(10) Patent No.: US 9,471,052 B2
(45) Date of Patent: Oct. 18, 2016

(54) ALARM VISUALIZATION

(71) Applicant: ABB Research Ltd., Zurich (CH)

(72) Inventors: Susanne Timsjo, Vasteras (SE); Saad Azhar, Vasteras (SE); Hongyu Pei-Breivold, Vasteras (SE)

(73) Assignee: ABB Research Ltd., Zurich (CH)

( * ) Notice: Subject to any disclaimer, the term of this patent is extended or adjusted under 35 U.S.C. 154(b) by 326 days.

(21) Appl. No.: 14/177,801

(22) Filed: Feb. 11, 2014

(65) Prior Publication Data

US 2014/0163740 A1    Jun. 12, 2014

Related U.S. Application Data

(63) Continuation of application No. PCT/EP2011/063803, filed on Aug. 11, 2011.

(51) Int. Cl.
*G06F 19/00* (2011.01)
*G05B 15/02* (2006.01)
*G05B 23/02* (2006.01)

(52) U.S. Cl.
CPC ........... *G05B 15/02* (2013.01); *G05B 23/0235* (2013.01); *G05B 23/0272* (2013.01)

(58) Field of Classification Search
USPC ............................................ 700/83, 17, 276
See application file for complete search history.

(56) References Cited

U.S. PATENT DOCUMENTS

| | | |
|---|---|---|
| 4,816,208 A | 3/1989 | Woods et al. |
| 5,167,010 A | 11/1992 | Elm et al. |
| 5,353,400 A * | 10/1994 | Nigawara ......... G05B 23/0272 715/771 |
| 5,768,119 A | 6/1998 | Havekost et al. |

(Continued)

FOREIGN PATENT DOCUMENTS

| | | |
|---|---|---|
| CN | 101676942 A | 3/2010 |
| DE | 10154534 A1 | 6/2002 |

(Continued)

OTHER PUBLICATIONS

First Office Action from China Application No. 2011800726732 Jun. 7, 2015 5 pages (translation included).

(Continued)

*Primary Examiner* — Kidest Bahta
(74) *Attorney, Agent, or Firm* — Whitmyer IP Group LLC (57) ABSTRACT

A method and device of controlling an industrial process. The method includes the steps of monitoring a plurality of values of at least one physical property of the industrial process to be controlled and determining whether the respective value of the at least one physical parameter deviates from a nominal value. Further, the method includes the step of displaying on a display screen, in chronological order, current state of the at least one physical property over time, which current state reflects the deviation of the respective value from the nominal value. Finally, the method includes the steps of providing on the display screen, when a user selects one of the current states, detailed information pertaining to the selected state and controlling the industrial process on the basis of the detailed information.

14 Claims, 5 Drawing Sheets

(56) References Cited

U.S. PATENT DOCUMENTS

| | | | | |
|---|---|---|---|---|
| 5,859,964 | A * | 1/1999 | Wang | H01L 22/20 257/E21.525 |
| 6,167,464 | A * | 12/2000 | Kretschmann | G05B 19/042 340/539.1 |
| 6,690,274 | B1 | 2/2004 | Bristol | |
| 6,999,898 | B2 * | 2/2006 | King | G01N 33/18 702/182 |
| 7,000,193 | B1 | 2/2006 | Impink, Jr. et al. | |
| 7,233,882 | B2 * | 6/2007 | Srinivasan | G05B 23/021 700/28 |
| 7,289,935 | B1 | 10/2007 | Hugo | |
| 8,224,473 | B2 * | 7/2012 | Selvaraj | G05B 23/024 345/440 |
| 2007/0132779 | A1 * | 6/2007 | Gilbert | G05B 19/0426 345/619 |
| 2007/0240071 | A1 * | 10/2007 | Sherrill | G05B 23/0267 715/764 |
| 2009/0125130 | A1 * | 5/2009 | Eldridge | G05B 15/02 700/87 |
| 2010/0123594 | A1 * | 5/2010 | Schleiss | G05B 23/0272 340/679 |
| 2010/0156654 | A1 | 6/2010 | Bullemer et al. | |
| 2010/0222899 | A1 * | 9/2010 | Blevins | G05B 17/02 700/80 |
| 2013/0246858 | A1 * | 9/2013 | Ceglia | G05B 23/0272 714/47.1 |

FOREIGN PATENT DOCUMENTS

| | | |
|---|---|---|
| DE | 10217107 A1 | 11/2002 |
| EP | 1727009 A1 | 11/2006 |
| GB | 2429088 A | 2/2007 |
| JP | H07281728 A | 10/1995 |
| JP | 2001067120 A | 3/2001 |
| JP | 2002091561 A | 3/2002 |
| JP | 2005209046 A | 8/2005 |
| JP | 2008020984 A | 1/2008 |
| WO | 2005093531 | 10/2005 |

OTHER PUBLICATIONS

International Preliminary Report on Patentability Application No. PCT/EP2011/063803 Completed: Aug. 5, 2013 10 pages.

International Search Report & Written Opinion of the International Searching Authority Application No. PCT/EP2011/063803 Completed: Apr. 4, 2012; Mailing Date: Apr. 16, 2012 9 pages.

* cited by examiner

ALARM VISUALIZATION

FIELD OF THE INVENTION

The present invention relates to a method and device of controlling an industrial process.

BACKGROUND OF THE INVENTION

On the market today, there are a number of automation systems where industrial process monitoring is facilitated. Thus, with these automation systems, an operator is typically given a detailed overview of the monitored industrial process via a user interface.

Generally in prior art automation systems, there is no support to visualize historical alarms based on selected process sections that are of interest, and use this visualization for further analysis of alarm information, for instance how often and alarm occurs, which alarms happen most frequently, etc.

In prior art automation systems, alarms are documented in long lists which do not provide operators with the flexibility of choosing process sections or equipment of interest, or give an intuitive overview status of historical alarms in terms of frequency, identification of problem areas in the control process, etc.

Japanese patent application having publication number JP 2008-20984 discloses a device for displaying information relating to alarms occurring in a plant in real time in a time-sequential order. In JP 2008-20984, it can be seen that the alarms are documented in long lists as is described hereinabove.

U.S. Pat. No. 5,167,010 discloses a display processing system that provides expert advice. The expert system 16 has a graphic display that indicates to the user a range 64 in which an actual value 62 of a parameter should be kept for safe or efficient operation of the process being monitored. The operator adjusts control points to keep the actual value indicator 62 within the range 64. As the process being monitored moves toward an out-of-normal state, an alarm management system 18 reinforces the graphic advice with general and then more detailed alarm messages that are displayed in priority order in goal and process message slots 114-122. Recommendations, in the form of an action script, for particular actions, based on expert system action indications, are also presented as the system state becomes more unacceptable. The invention also displays an historical perspective of the process parameters being monitored and, through a prediction module 20, provides a prediction of the future state of the process and process parameters. The alarm management system 18 compares the prediction with fixed position threshold as well as the range to produce event prediction messages. The expert advice displays are arranged in a functional hierarchy that can be traversed by the operator for advice at various levels of detail where lower levels provide a natural explanation of higher levels.

SUMMARY OF THE INVENTION

An object of the present invention is to solve or at least mitigate these problems in the prior art.

In a first aspect of the invention, this object is attained by a method of controlling an industrial process, which comprises the steps of monitoring a plurality of values of at least one physical property of the industrial process to be controlled and determining whether the respective value of the at least one physical parameter deviates from a nominal value. Further, the method comprises the step of displaying on a display screen, in chronological order, current state of the at least one physical property over time, which current state reflects the deviation of the respective value from the nominal value. Finally, the method comprises the steps of providing on the display screen, when a user selects one of the current states, detailed information pertaining to the selected state and controlling the industrial process on the basis of the detailed information.

In a second aspect of the invention, this object is attained by a device for controlling an industrial process, which device comprises a display and a processing unit. The processing unit is arranged to monitor a plurality of values of at least one physical property of the industrial process to be controlled, and to determine whether the respective value of said at least one physical parameter deviates from a nominal value. The display is arranged to display, in chronological order, current state of the at least one physical property over time, which current state reflects the deviation of the respective value from the nominal value, and to provide, when a user selects one of the current states, detailed information pertaining to the selected state. Further, the processing unit is arranged to control the industrial process on the basis of the detailed information.

Thus, the present invention is advantageous in that historical alarm visualization is provided for analysis based on selected process sections or equipment of interest. The analysis is done based on aggregated and detailed alarm information. The operator or control engineer can choose from the display the process sections or equipment that he/she wants to focus on. The corresponding alarms that have occurred in the selected section or equipment will be shown in chronological order, i.e. along a timeline. The detailed alarm information is presented depending on the operator selection.

Once the operator or control engineer selects an area in order to have a closer look at the alarms, a summary report will be automatically generated with detailed alarm information. The operator can as a result quickly obtain an overview of the process and identify hot spots in the control process over time, and control the industrial process on the basis of this information.

In an embodiment of the present invention, the step of displaying current state of the at least one physical property on a display screen further comprises the step of indicating degree of deviation of the respective value from the nominal value. Thus, the severity of the current state of the physical property is displayed, which implies that alarms presented on the display screen are given a particular appearance depending on their particular classification. It should be noted that the degree of deviation could be indicated in many different ways; for instance, a minor alarm could be indicated in yellow, while a major alarm is indicated in red. Another way of classifying alarms would be to indicate minor alarms by means of a striped pattern while major alarms could be indicated by means of a chequered pattern.

In a further embodiment of the present invention, the step of providing detailed information pertaining to a selected state on the display screen further comprises the step of providing information on how to control the industrial process such that the respective value returns to its nominal value. In still a further embodiment of the present invention, this is attained by including in the information which of the components of the industrial process should be controlled and which control signals should be applied to the respective component for the respective value to return to its nominal value. This is advantageous in that hands-on information on how to control the industrial process such that the respective value returns to its nominal value is provided.

The invention has mainly been described above with reference to a few embodiments. However, as is readily appreciated by a person skilled in the art, other embodiments than the ones disclosed above are equally possible within the scope of the invention, as defined by the appended patent claims.

BRIEF DESCRIPTION OF THE DRAWINGS

Embodiments of the present invention and advantages thereof will now be described by way of non-limiting examples, with reference to the accompanying drawings, where.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
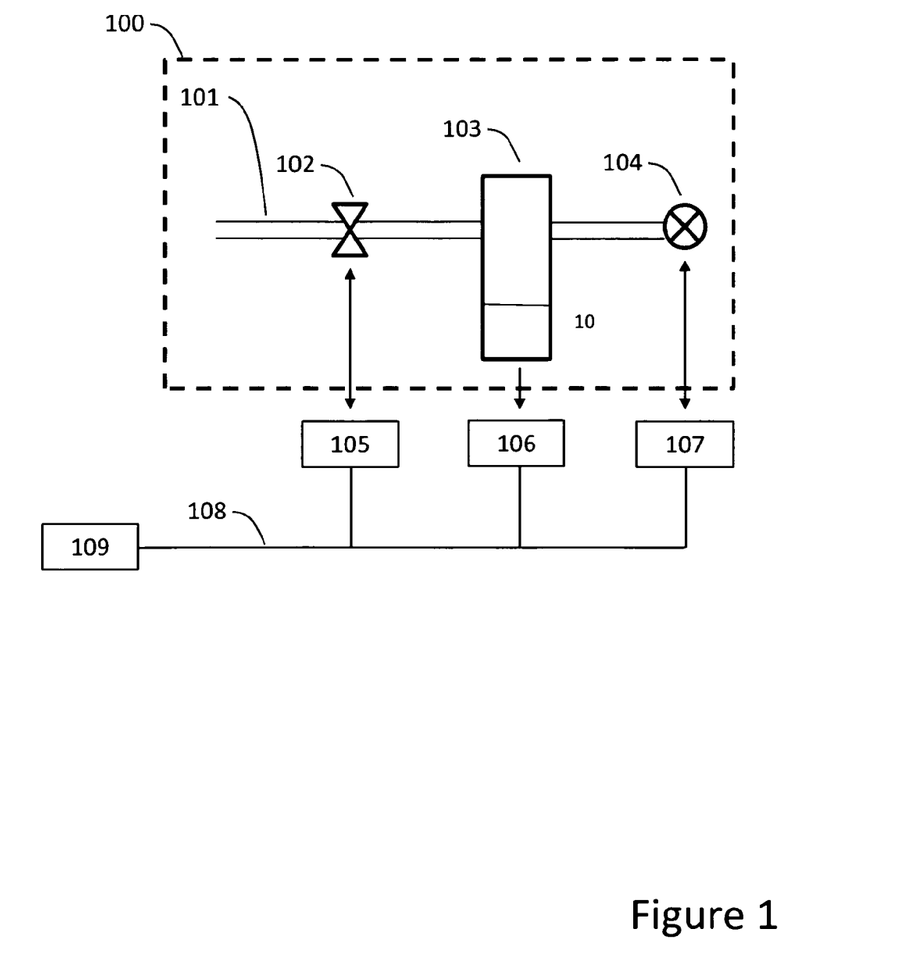
FIG. 1 illustrates an industrial process to be monitored.

FIG. 1 illustrates an industrial process 100 to be monitored in accordance with an embodiment of the invention. This industrial process is exemplified in the form of a pipe 101 leading liquid, for instance gasoline, to a valve 102. The valve determines how much if any of the gasoline should be delivered to a tank 103 via the pipe 101. In this particular example, the level of gasoline in the tank is 10 units. From the tank, the gasoline is supplied to a motor 104. It should be noted that this example is greatly exemplified and in real-life, an industrial process to be monitored is typically considerably more complex.

Now, to be able to monitor the industrial process 100, the components of the process are connected to a respective measuring device 105, 106, 107 for collecting measurement data from the industrial process. This could possibly be performed by using OPC Unified Architecture (OPC UA), which is a platform independent protocol which specifies how to exchange data between different systems, software applications and hardware devices. OPC UA enables exchange of data between software applications independently of the application's vendor, supported operating system, and used programming language. In that case, the measuring devices 105, 106, 107 would be implemented in the form of OPC servers. In case the components 102, 103, 104 permit external control, OPC data to control the components can be sent to the respective OPC server. For instance, OPC server 105 may collect data relating to flow of gasoline through the valve 102, but may also allow control of the flow through the valve by means of using OPC data for the control such that the level of gasoline in the tank 103 can be regulated. In this particular example, the tank 103 is a relatively passive process component, which does not offer any property control, but which delivers data pertaining to the gasoline level to the OPC server 106. Finally, the OPC server 107 collects data from the motor 104 regarding motor speed. Further, the motor speed can be regulated by the OPC server 107 when appropriate OPC data is supplied.

The OPC servers are typically connected to a bus 108 for delivering measured process data to, and receiving process control data from, an operator work station 109.

In order for an operator to be able to monitor the industrial process at his or her work station 109, a graphical representation of the industrial process must be provided. This graphical representation would typically look very similar to the industrial process 100 as it is depicted in FIG. 1.

Further, it would be highly desirable to provide the operator with adequate information pertaining to alarms of the industrial process such that the operator quickly can act on the alarms and control the industrial process to overcome abnormal and potentially hazardous situations or even preventing them from occurring.

Figure 2:
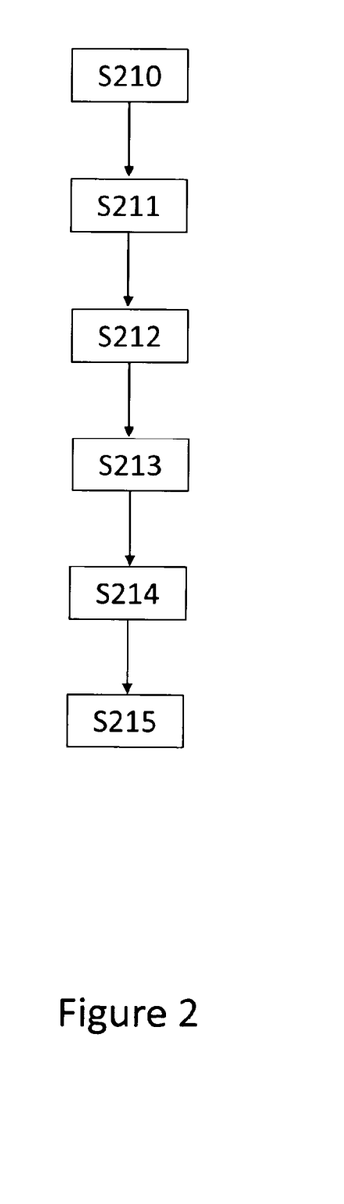
FIG. 2 illustrates an embodiment of the method according to the present invention.

In an embodiment of a method of the present invention illustrated with reference to FIG. 2, this is undertaken by means of first, in step S210, monitoring a plurality of values of at least one physical property of the industrial process to be controlled. For instance, the monitored property could be the level of gasoline in the tank 103 of FIG. 1. The level of gasoline is repeatedly measured and in step S211, it is determined whether the respective value of the level of gasoline deviates from a nominal value. Assuming that a nominal value of the gasoline level is 10 and any value differing from the nominal value with ±2 units is considered to deviate, any gasoline level value above 12 and below 8 would render an alarm. In step S212, current state of the monitored values of the physical property is displayed to a process operator. Hence, for the repeatedly monitored gasoline levels, their current state is displayed to the operator, and as long as the level is above 12 or below 8, an alarm state is displayed. The level of gasoline in tank 103 could be affected by inherent inertia in the system and be adjusted without operator interference within short from an alarm indication, but it could also be that an action must be taken by the operator in order to remedy an error or resolve an abnormal situation in the industrial process. Thus, the alarms are presented to the operator in chronological order on the display screen, and when the operator indicates one or more of the alarms (i.e. the current states of the monitored physical property) in step S213, detailed information pertaining to the indicated alarm(s) is displayed on the screen in step 214. Finally, in step S215, the operator controls the industrial process on the basis of the detailed information. In this particular example, the detailed alarm information may e.g. instruct an operator to control the valve 102 via OPC server 105 such that the level of gasoline in tank 103 rises i.e. returns to its nominal value.

In an embodiment of the present invention, the detailed alarm information provides hands-on information on how to control the industrial process such that the respective value returns to its nominal value. For instance, the detailed information may be arranged in such a manner that the operator is instructed to change the flow of valve to, say, a flow of 10 liters of gasoline per hour, whereby the operator swiftly sends a command to OPC server 105 to effect this instruction.

Figure 3:
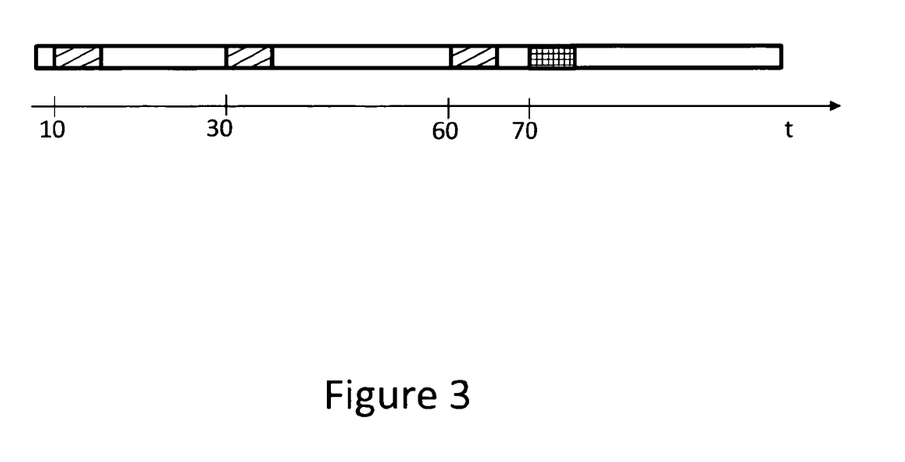
FIG. 3 illustrates an alarm indicator according to an embodiment of the present invention.

FIG. 3 illustrates a further embodiment of the invention. Again, a plurality of values of a physical property (in the form of e.g. gasoline level in tank 103 of FIG. 1) of the industrial process to be controlled is monitored. It is then determined for each monitored value whether it deviates from a nominal value. Again, any value deviating from the nominal value with ±2 units is considered to warrant an alarm. However, in this particular embodiment a first, smaller deviation would render a minor alarm, while a second, greater deviation would render a major alarm. For instance, a value deviating from the nominal value with, say, ±7 units would render a major alarm since there is a risk that the tank 103 of FIG. 1 either will overflow or be emptied in case such a deviation occurs. Hence, for the repeatedly monitored gasoline levels, their current state is displayed to the operator in chronological order over time, and as long as the level is above 12 or below 8, the current state is realized in the form of a displayed minor alarm. This is illustrated in FIG. 3 at times 10, 30 and 60 where three striped boxes indicates three minor alarms. At time 70, a major alarm occurs which is illustrated by a chequered box. Thus, degree of deviation of the current state from the nominal state is indicated on the display. It should be noted that the degree of deviation could be indicated in many different ways; for instance, a minor alarm could be indicated in yellow, while a major alarm is indicated in red. In order to resolve the situation that has arisen, the operator indicates one or more alarms and detailed information pertaining to the indicated alarm(s) is displayed on the screen. Finally, the operator controls the industrial process on the basis of the detailed information.

In many industrial processes, it is important that an alarm is reported in real-time, i.e. it should be reported as soon as it occurs as it may be necessary for an operator to act immediately on an alarm. Thus, the physical properties are monitored in real-time and their current state is displayed to the operator on-the-fly.

Figure 4:
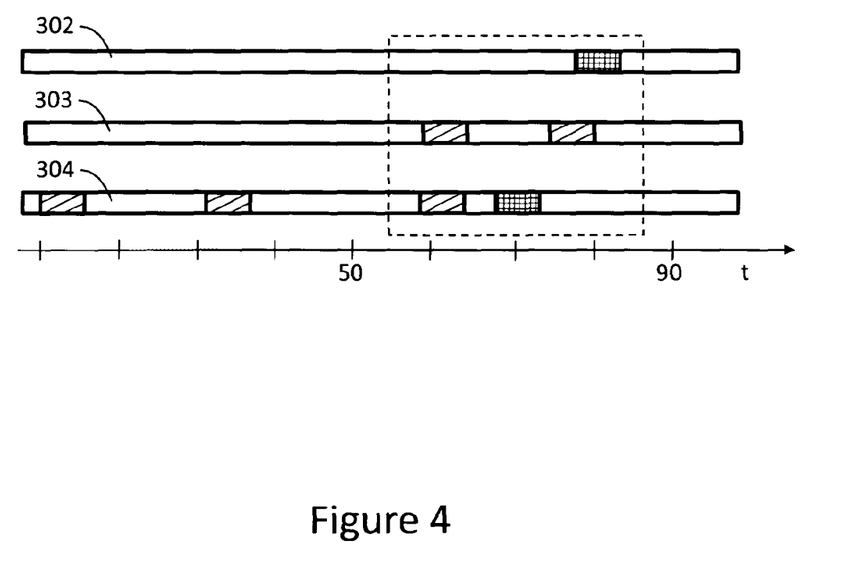
FIG. 4 illustrates alarm indicators according to a further embodiment of the present invention.

With reference to FIG. 4, a snapshot of a display screen showing a plurality of alarms is illustrated. In FIG. 4, the top alarm indicator denoted with 302 relates to valve 102 in FIG. 1, while middle alarm indicator 303 relates to tank 103 and bottom alarm indicator 304 relates to motor 104. It should further be noted that not only different equipment relating to a same section of the industrial process could be displayed as is the case hereinabove, but it is also envisaged that different sections of the industrial process could be displayed. For instance, one alarm indicator could relate to a paper pulp device, while a second indicator could relate to a rolling machine and a third indicator could be associated with a drying plant.

Again, a plurality of values of a physical property of the industrial process to be controlled is monitored. In this particular embodiment, the physical properties monitored are the flow through valve 102, the gasoline level in tank 103 and the speed of motor 104 of FIG. 1. For each value of the respective physical property, it is determined whether a deviation from a nominal value exists. Then, current state of the respective physical property over time with respect to its nominal value is displayed in chronological order. Thus, in the snapshot shown in FIG. 4, the top alarm indicator 302 related to the valve indicates one major alarm, while the middle alarm indicator 303 associated with the tank displays two minor alarms and the bottom alarm indicator 304 pertaining to the motor displays three minor alarms and one major alarm.

In the particular embodiment shown in FIG. 4, the operator indicates alarms of all three devices (enclosed by the dashed marker box), roughly between times 55-95. The resulting detailed alarm information has the following exemplifying appearance:

| Alarms | Description | Time | Occurrence | Status | Action |
|--------|-------------|------|------------|--------|-----------|
| TB318  | Valve2      | 78   | 1          | Major  | Close     |
| PA510  | Tank1       | 59   | 1          | Minor  | No action |
| PA510  | Tank1       | 75   | 2          | Minor  | No action |
| CD32   | Motor43     | 58   | 3          | Minor  | Slow down |
| CD32   | Motor43     | 67   | 4          | Major  | Stop      |

Hence, for the valve, a major alarm occurs at t=78 and the operator is instructed to closes the valve. The operator acts on this information and commands OPC server 105 of FIG. 1 to close the valve 102. This appears to resolve the situation, since alarm TB318 does not reoccur.

For the tank, a minor alarm occurs at t=59 and the operator is instructed to take no action. The same alarm occurs at t=75 and again, the operator is instructed to take no action. The alarm PA510 does not reoccur.

For the motor, a minor alarm occurs at t=58. Although still a minor alarm, the operator is instructed to slow the motor down. The operator acts on this information and commands OPC server 107 of FIG. 1 to slow the motor 104 down. At t=67, the alarm CD32 occurs again, this time being considered major. The operator is instructed to shut the motor down.

It should be noted that for the motor, minor alarms occur at both t=10 and t=31. However, these are not indicated by the operator by means of the dashed marker box, so no detailed information is given. Nevertheless, the first alarm of type CD32 in the list above is indicated to occur for the third time. Hence, in terms of alarm frequency, it is still possible that previously occurring alarms are accounted for even though these previously occurring alarms are not indicated by the operator.

Thus, in order to resolve the abnormalities in the industrial process, the operator indicates the plurality of alarms and detailed information pertaining to the indicated alarms is displayed on the screen. Finally, the operator controls the industrial process on the basis of the detailed information.

Figure 5:
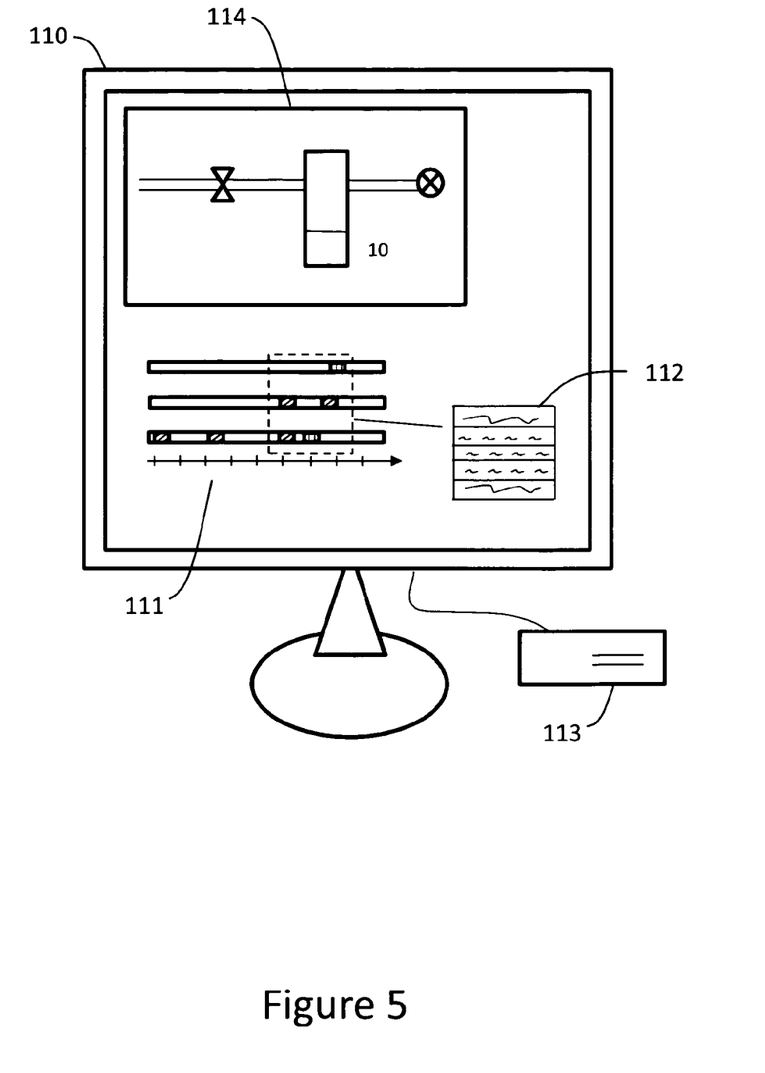
FIG. 5 illustrates a work station of an industrial process operator according to an embodiment of the present invention.

FIG. 5 illustrates a work station of an industrial process operator. The work station 109 of FIG. 1 is realized by means of a computer screen or monitor 110 at which the operator typically is located when supervising the industrial process 100 of FIG. 1, and a processing unit 113, e.g. a general or special purpose computer. The computer typically comprises a processor arranged to execute program code downloaded to a memory associated with the processor. In an embodiment of the present invention, the processor is arranged to carry out at least parts of the steps of the method according to the present invention when appropriate program code is downloaded to the memory and executed by the processor. Thus, the program code comprises computer-executable components for causing the computer 113 to perform at least parts of the steps of the method according to the present invention when the computer-executable components are run on the processor included in the computer. The processing unit may alternatively be embodied in the form of an application specific integrated circuit (ASIC), a field-programmable gate array (FPGA), a complex programmable logic device (CPLD), etc. It is envisaged that the work station 109 of FIG. 1 even could be embodied in the form of a mobile phone, via which an industrial process is monitored and controlled.

On the computer screen 110 of the work station, a set of graphical objects 114 representing the physical components of the monitored industrial process is displayed. The generation of such graphical objects is outside the scope of the present invention. The alarm indicators illustrated in FIG. 3 is denoted 111. When the operator indicates on the computer screen a section of alarms for which detailed information is required, the detailed information comprises in the alarm table described hereinabove is shown at 112. In order to resolve the abnormalities occurring in the industrial process, which results in the alarms, the operator controls the industrial process on the basis of the detailed information by means of submitting instructions to the processing unit 113 which communicates accordingly with the industrial process. For instance, with reference made to the alarm table shown in the above, a minor alarm occurs at t=58 and the operator is instructed to slow the motor down. Thus, the operator may enter a new motor speed value via a work station keyboard and the processing unit passes the new value on the motor in the monitored industrial process such that the motor is slowed down. In practice, the processing unit 113 will instruct OPC server 107 of FIG. 1 to slow the motor 104 down.

The skilled person in the art realizes that the present invention by no means is limited to the examples described hereinabove. On the contrary, many modifications and variations are possible within the scope of the appended claims.

What is claimed is:

1. A method of controlling an industrial process, comprising the steps of:
   monitoring, with one or more measuring devices, a plurality of values of at least one physical property of the industrial process to be controlled;
   determining, with a processing unit, whether the respective value of said at least one physical property deviates from a nominal value;
   displaying on a display screen, in chronological order, current state of the at least one physical property over time, which current state reflects the deviation of the respective value from the nominal value;
   providing on the display screen, when a user selects one of the current states, detailed information pertaining to the selected state; and
   controlling, with the processing unit, the industrial process on the basis of the detailed information.

2. The method according to claim 1, wherein the current state of said at least one physical property is an alarm.

3. The method according to claim 1, wherein the step of displaying current state of the at least one physical property on a display screen further comprises the step of:
   indicating degree of deviation of said respective value from the nominal value.

4. The method according to claim 1, wherein the step of providing detailed information pertaining to a selected state on the display screen further comprises the step of:
   providing information on how to control the industrial process such that the respective value returns to its nominal value.

5. The method according to claim 4, wherein the provision of information on how to control the industrial process such that the respective value returns to its nominal value comprises information on which of the components of the industrial process should be controlled and which control signals should be applied to the respective component for said respective value to return to its nominal value.

6. The method according to claim 1, wherein the step of providing detailed information pertaining to a selected state on the display screen further comprises the step of:
   providing information regarding historical occurrence of the selected state.

7. A device for controlling an industrial process, comprising:
   a display; and
   a processing unit;
   said processing unit being arranged to monitor a plurality of values of at least one physical property of the industrial process to be controlled, and to determine whether the respective value of said at least one physical property deviates from a nominal value;
   said display being arranged to display, in chronological order, current state of the at least one physical property over time, which current state reflects the deviation of the respective value from the nominal value, and to provide, when a user selects one of the current states, detailed information pertaining to the selected state; and
   said processing unit further being arranged to control the industrial process on the basis of the detailed information.

8. The device according to claim 7, wherein the current state of said at least one physical property is an alarm.

9. The device according to claim 7, wherein the display further is arranged to:
   indicate degree of deviation of said respective value from the nominal value.

10. The device according to claim 7, wherein the display further is arranged to:
    provide information on how to control the industrial process such that the respective value returns to its nominal value.

11. The device according to claim 10, wherein the provision of information on how to control the industrial process such that the respective value returns to its nominal value comprises information on which of the components of the industrial process should be controlled and which control signals should be applied to the respective component for said respective value to return to its nominal value.

12. The device according to claim 7, wherein the display further is arranged to:
    provide information regarding historical occurrence of the selected state.

13. A non-transitory computer program product comprising computer-executable components for causing a device to perform the steps, when the computer-executable components are run on a processing unit included in the device, of:
    monitoring, with one or more measuring devices, a plurality of values of at least one physical property of the industrial process to be controlled;
    determining, with the processing unit, whether the respective value of said at least one physical property deviates from a nominal value;
    displaying on a display screen, in chronological order, current state of the at least one physical property over time, which current state reflects the deviation of the respective value from the nominal value;
    providing on the display screen, when a user selects one of the current states, detailed information pertaining to the selected state; and
    controlling, with the processing unit, the industrial process on the basis of the detailed information.

14. The method according to claim 1, wherein the step of displaying comprises displaying how frequently an alarm occurs.

\* \* \* \* \*